3,226,450
PROCESS FOR THE PRODUCTION OF ARYL MAGNESIUM CHLORIDES

Manfred Blazejak, Dusseldorf, and Rudolf Stroh, Leverkusen-Bayerwerk, Germany, assignors to Farbenfabriken Bayer Aktiengesellschaft, Leverkusen, Germany, a corporation of Germany
No Drawing. Filed Aug. 8, 1962, Ser. No. 215,501
Claims priority, application Germany, Sept. 21, 1961,
F 34,965
9 Claims. (Cl. 260—665)

The present invention relates to a particularly expedient process for the production of aryl magnesium chlorides by reacting magnesium with aryl chlorides, and using more especially organic aluminium compounds as catalysts.

It is known that the reaction of magnesium with aryl chlorides to form organomagnesium chloride compounds, presents great difficulties by comparison with the analogous reaction of the corresponding aryl bromides and iodides. Since the aforementioned chlorine complex compounds are known to be of relatively high interest for many organic synthesis reactions, there has been no lack hitherto of attempts to obviate these difficulties.

For example, it has already been recommended to use copper-magnesium alloys, but these must be activated with iodine at about 300° C. prior to the use thereof. However, the effect of these magnesium-copper alloys activated with iodine has been further disputed by other parties. Alloys of magnesium with other metals, such as lead, manganese, cadmium, zinc, silicon, aluminum, iron, chromium, nickel and others, are also already known for the production of organomagnesium chlorides. However, all these processes are very complicated and lead only to unsatisfactory yields.

Methods of preparing aryl magnesium chlorides are also known, in which cyclic tetramethylene or pentamethylene oxides, advantageously tetrahydrofuran, are used as solvents and activators. It is true that the yields with these processes are adequate, but apart from the labor involved in purifying and drying the solvent or activator, the organomagnesium chloride is obtained in the form of a complex compound with the solvent, from which the pure magnesium compound can only be liberated with very great difficulty.

Consequently, processes have already been recommended in which aryl chlorides are reacted directly with magnesium and in the absence of a solvent, the magnesium being activated with $Cu^I$-halides or $AlCl_3$ or $AlBr_3$. Alternatively, another organomagnesium-halogen compound is first of all prepared and this is then employed as activator. The aryl magesium halide formed in this way is obtained as a yellow to brown powder. For the production of relatively large quantities, however, some of these processes are too complicated and time-consuming and in others the yield is unsatisfactory. In addition, it is difficult to remove unreacted magnesium metal from the reaction mixture.

Recently, a process for the production of phenyl magnesium chloride has been proposed in which the magnesium was activated with $CCl_4$ or $SiCl_4$ and boiled for a relatively long time with chlorobenzene in an inert atmosphere. According to the literature data, the yield in this case is 75% of phenyl magnesium chloride.

However, this process is also still unsatisfactory since relatively large quantities of magnesium are left and these may have to be separated out. The yield is also still not entirely satisfactory and the process is only suitable for the production of phenyl magnesium chloride.

It is an object of the present invention to make available particularly desirable catalysts for the reaction of magnesium with aryl chlorides. Another object is that the catalysts only have to be used in small quantities and nevertheless lead to high yields. Other objects will be apparent from the following description and the examples.

It has now been found that aryl magnesium chlorides can be prepared in a particularly simple and general manner by reacting magnesium with aryl chlorides in the presence of a catalyst, the catalyst being one or more organic aluminum compounds of the formula $$AlR_nX_m$$

in which R is an alkyl radical or a hydrogen atom, X is a halogen atom, n is 1, 2 or 3 and m is 0, 1 or 2, the sum of n and m always being equal to 3 and the organic aluminum compounds always containing at least one alkyl radical.

It is to be considered as extremely surprising that aluminum trialkyls catalyze the reaction of magnesium and aryl chlorides. It is, however, especially surprising that even very small quantities of aluminum trialkyls lead to very high yields. Even if mixed aluminum alkyl halides are used instead of the aluminum trialkyls, the use of relatively small additions produces higher yields than is the case for example when aluminum trihalides are used.

The reaction of magnesium with aryl chlorides for the production of aryl magnesium chlorides is quite generally known. For this reaction, chlorobenzenes, such as chlorotoluenes and chloroxylene, but also chloronaphthalenes as well as alkyl chloronaphthalenes such as ethyl chloronaphthalene, can for example be used as aryl chlorides. The catalysts according to the invention can be employed in all embodiments of this known reaction.

As is already known, the reaction between magnesium and the aryl chloride can also be carried out in the presence of a solvent. Aromatic hydrocarbons, such as benzene, toluene and xylene, cycolaliphatic hydrocarbons, such as decalin, and mixed aromatic cycloaliphatic hydrocarbons, such as tetralin, are, for example, suitable for this purpose.

The catalysts employed according to this invention are clearly defined by the formula given above. In this formula given below. In this formula, R stands for alkyl radicals which advantageously contains 1–8 carbon atoms, such as methyl, ethyl, isobutyl and hexyl radicals. X stands for halogen, preferably for chlorine, bromine and iodine.

The following are mentioned as examples of preferred compounds which can be used: aluminum triethyl, aluminum triisobutyl, aluminum trihexyl, aluminum diisobutyl hydride, aluminum diethyl diodide, aluminum diisobutyl bromide, aluminum ethyl dichloride, aluminum ethyl sesquichloride, (mixtures of aluminum diethyl chloride and aluminum ethyl dichloride) and aluminum isopropyl diiodide.

The reaction is carried out in the usual temperature range, that is to say, between approximately 30 and 250° C.

For carrying out the reaction according to the invention, about 1 mol of aryl chloride can be used to 1 gram atom of magnesium. An excess can also be employed and it then acts as a solvent. The mixture is brought to a suitable temperature, the reaction usually starting after a few minutes. Within a few hours, the aryl magnesium chloride is obtained in a yield higher than 90%. If the reactants are introduced in stoichiometric quantities, it is advisable generally to work in the presence of a solvent. The working up is carried out by conventional methods and can for example be effected by fractionated distillation.

The catalyst according to the invention is added in quantities between 0.1 and 5%, based on the magnesium metal used, and advantageously in quantities between 0.1 and 2%.

Generally speaking, the prepared organic aluminum compounds are added. If compounds of the type AlR$_2$X or AlRX$_2$ are used, it is not necessary for the organo-aluminum-halogen compounds to be synthesized beforehand. It has actually been found that surprisingly the said compounds are also already effective in status nascendi. One particularly simple embodiment consequently comprises preparing the catalysts in the reaction mixture from aluminum and the alkyl halide. For this purpose, about 1–3 mols of alkyl halide and preferably 2 mols thereof are used to 1 gram atom of aluminum. On heating the reaction mixture, the organoaluminum-halogen compounds of the aforementioned types are then formed. Generally, mixtures of organic aluminum compounds with 1 and 2 alkyl radicals are formed. The process can be carried out batchwise or continuously, the phenyl magnesium halide and more especially chloride suspension which is formed being constantly separated and always fresh magnesium and aryl halide being re-supplied to the reaction chamber.

The process of the invention has a number of advantages. Only very small quantities of catalyst are required and high yields are obtained. Furthermore, it is not limited to the production of phenyl magnesium chloride, but can be used quite generally. On account of its simplicity, the process can also be carried out industrially on a relatively large scale.

The invention is further disclosed in the following examples, which are illustrative but not limitative thereof.

Example 1

Using a three-necked flask with a stirrer device, reflux condenser and dropping funnel, 30 parts by weight of magnesium chips and 150 parts by weight of chlorobenzene are heated to boiling point with the exclusion of air and moisture and under an atmosphere of nitrogen or argon. 0.15 part by weight of aluminum triisobutyl is added to initiate the reaction. After a few minutes, the reaction commences with discoloration of the reaction mixture. The reaction intensifies and a yellow suspension of phenyl magnesium chloride starts to precipitate. Another 150 parts by weight of chlorobenzene are added from the dropping funnel in small portions to the reaction mixture until the completion of the reaction, after about 10 hours. Thereafter, a thick yellow paste of phenyl magnesium chloride is found in the reaction chamber. The unreacted chlorobenzene is distilled off in vacuo, the phenyl magnesium chloride is dissolved in ether and filtered off from the unreacted magnesium. The yield of phenyl magnesium chloride is 95%, based on the magnesium introduced.

Example 2

100 parts by weight of magnesium chips are reacted as in Example 1 with 800 parts by weight of 4-chloro-toluene and 0.5 part by weight of aluminum diethyl bromide is added. The reaction proceeds as described in Example 1 and the conversion is completed after 10 hours. The yield of tolyl magnesium chloride is 92%.

Example 3

30 parts by weight of magnesium and 300 parts by weight of chlorobenzene are reacted as in Example 1. 0.2 part by weight of coarse aluminum powder and 0.8 part by weight of ethyl bromide are added. The reaction proceeds as described in Example 1 and the yield of phenyl magnesium chloride is 94%.

Example 4

30 parts by weight of magnesium are reacted as in Example 1 with 160 parts by weight of chlorotoluene, dissolved in 400 parts by weight of xylene. 0.5 part by weight of aluminum diethyl chloride is added and the reaction starts after a few minutes. It proceeds as described in Example 1 and is completed after 8 hours. The yield of tolyl magnesium chloride is 94%.

Example 5

30 parts by weight of magnesium are reacted as described in Example 1, with 200 parts by weight of 1-chloronaphthalene, dissolved in 500 parts by weight of tetrahydronaphthalene. 0.3 part by weight of aluminum triethyl is added and the reaction starts after a few minutes, being completed after 4 hours. The yield of naphthyl magnesium chloride is 93%.

We claim:
1. A process for the preparation of aryl magnesium chlorides which comprises contacting magnesium with an aryl chloride in the present of 0.1 to 5% by weight calculated on the magnesium of an organo aluminum compound selected from the group consisting of aluminum alkyl and aluminum alkyl halide, at a temperature within the range of from 30° C. to about 250° C.

2. Process according to claim 1 wherein said aryl halide is chlorobenzene.

3. Process according to claim 1 wherein said aryl halide is 4-chlorotoluene.

4. Process according to claim 1 wherein said aryl halide is 1-chloronaphthalene.

5. Process according to claim 1 wherein said organo aluminum compound is aluminum triisobutyl.

6. Process according to claim 1 wherein said organo aluminum compound is aluminum diethylchloride.

7. A process for the preparation of phenyl magnesium chloride which comprises contacting magnesium with chlorobenzene in the presence of 0.15 part by wt. of aluminum tri-isobutyl at a temperature within the range of from 30° C. to about 250° C.

8. A process for the preparation of tolyl magnesium chloride which comprises contacting magnesium with 4-chlorotoluene in the presence of 0.5 part by wt. of aluminum diethyl bromide at a temperature within the range of from 30 to 250° C.

9. A process for the preparation of naphthyl magnesium chloride which comprises contacting magnesium with 1-chloronaphthalene in the presence of 0.3 part by wt. of aluminum triethyl at a temperature within the range of from 30 to 250° C.

References Cited by the Examiner
UNITED STATES PATENTS
3,082,232   3/1963   Nowlin et al. _____ 260—448

FOREIGN PATENTS
807,632   1/1937   France.

TOBIAS E. LEVOW, *Primary Examiner.*